United States Patent
Seely et al.

(10) Patent No.: US 10,410,327 B2
(45) Date of Patent: Sep. 10, 2019

(54) SHALLOW DEPTH OF FIELD RENDERING

(71) Applicant: Apple Inc., Cupertino, CA (US)

(72) Inventors: Richard D. Seely, San Jose, CA (US); Michael W. Tao, San Jose, CA (US); Alexander Lindskog, San Jose, CA (US); Geoffrey T. Anneheim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/990,154

(22) Filed: May 25, 2018

(65) Prior Publication Data

US 2018/0350043 A1     Dec. 6, 2018

Related U.S. Application Data

(60) Provisional application No. 62/514,685, filed on Jun. 2, 2017.

(51) Int. Cl.
| | |
|---|---|
| *H04N 5/232* | (2006.01) |
| *G06T 5/50* | (2006.01) |
| *G06T 5/00* | (2006.01) |
| *G06T 7/90* | (2017.01) |

(52) U.S. Cl.
CPC ............ *G06T 5/002* (2013.01); *G06T 5/50* (2013.01); *G06T 7/90* (2017.01); *H04N 5/23216* (2013.01); *G06T 2207/10024* (2013.01)

(58) Field of Classification Search
CPC .. G06T 5/002; G06T 5/50; G06T 7/90; G06T 2207/10024; H04N 5/23216
See application file for complete search history.

(56) References Cited

U.S. PATENT DOCUMENTS

| | | |
|---|---|---|
| 5,048,109 A | 9/1991 | Bloomberg |
| 8,861,884 B1 | 10/2014 | Fang |
| 9,094,609 B2 | 7/2015 | Kim |
| 9,171,352 B1 | 10/2015 | Raynaud |

(Continued)

OTHER PUBLICATIONS

Ramakrishnan, Harish Narayanan, "Detection and estimation of image blur," Masters Thesis, Missouri University of Science and Technology, Fall 2010.

*Primary Examiner* — Mekonnen D Dagnew
(74) *Attorney, Agent, or Firm* — Blank Rome LLP

(57) ABSTRACT

This disclosure relates to techniques for synthesizing out of focus effects in digital images. Digital single-lens reflex (DSLR) cameras and other cameras having wide aperture lenses typically capture images with a shallow depth of field (SDOF). SDOF photography is often used in portrait photography, since it emphasizes the subject, while deemphasizing the background via blurring. Simulating this kind of blurring using a large depth of field (LDOF) camera may require a large amount of computational resources, i.e., in order to simulate the physical effects of using a wide aperture lens while constructing a synthetic SDOF image. However, cameras having smaller lens apertures, such as mobile phones, may not have the processing power to simulate the spreading of all background light sources in a reasonable amount of time. Thus, described herein are techniques to synthesize out-of-focus background blurring effects in a computationally-efficient manner for images captured by LDOF cameras.

27 Claims, 10 Drawing Sheets

(56) References Cited

U.S. PATENT DOCUMENTS

| | | | |
|---|---|---|---|
| 9,349,165 B2 | 5/2016 | Cho | |
| 2012/0063697 A1* | 3/2012 | Han | G06T 5/004 |
| | | | 382/255 |
| 2013/0243330 A1 | 9/2013 | Chiu | |
| 2015/0002545 A1* | 1/2015 | Webster | G09G 5/377 |
| | | | 345/634 |
| 2015/0054986 A1* | 2/2015 | Tanaka | H04N 5/2621 |
| | | | 348/239 |
| 2015/0172547 A1 | 6/2015 | Wang | |
| 2016/0048952 A1 | 2/2016 | Tezaur | |

\* cited by examiner

SHALLOW DEPTH OF FIELD RENDERING

TECHNICAL FIELD

This disclosure relates generally to the field of digital imaging. More particularly, but not by way of limitation, it relates to techniques for synthesizing out-of-focus blurring effects (also known as "shallow depth of field" or "bokeh") in a computationally-efficient manner.

BACKGROUND

In camera imaging, multiple factors, such as the size of the lens aperture, may influence the depth of field of an image. Large digital single-lens reflex (DSLR) cameras and cameras having wide aperture lenses can be used to capture images with a relatively shallow depth of field (SDOF), meaning that the range of scene depths for which objects in the captured image will appear sharp (i.e., in focus) is very small compared to images captured under other conditions (e.g., a narrower aperture). While the limited range of in-focus regions of a SDOF image may seem to be a physical limitation, it has been turned into an aesthetic advantage by photographers for over a century. For example, so-called SDOF photography may be particularly fit for portrait photography, since it emphasizes the subject (who is typically brought into the camera's focus range), while deemphasizing the background (e.g., by making the background appear blurry and/or out of focus), which may otherwise be of little interest in the scene.

In some instances, such as small form factor cameras used in mobile devices, it may be difficult to optically achieve a given level of SDOF. For example, a mobile phone camera may have a smaller aperture than the smallest aperture used by a DSLR camera, and thus may have a relatively large depth of field compared to what may be achieved by a DSLR camera. In these instances, to achieve an image having a shallower depth of field, it may be necessary to artificially introduce/simulate an out-of-focus blur in the image after it is captured.

Synthetically creating a natural-looking SDOF effect may be difficult. In particular, background light sources in such SDOF images may appear as large, blurred colored discs in the image, while the other background portions of the scene will simply appear blurry and out of focus, i.e., as compared to a foreground object in the scene that is close to the focus plane of the image, and thus appears sharp. Thus, the boundaries between foreground and background objects in an SDOF image may represent abrupt transitions from sharp pixels to blurry pixels, and any inaccuracies in rendering these boundaries (e.g., in the form of blurry background pixels 'bleeding' into a foreground object that should appear sharp, or vice versa) may result in images that look physically inaccurate or unnatural to a viewer.

Additionally, attempting to simulate this kind of out-of-focus blur may require a large amount of computational resources. For example, a naïve approach may attempt to simulate the SDOF effects by spreading every pixel in the image's light intensity onto every other pixel in the image that is within its blurring radius, adding all those values in an accumulator, and then repeating that spreading and accumulation process for every pixel in the image that needs to be blurred. Such approaches also may require meticulous user intervention and fine tuning to adjust the resulting image to have an acceptable synthetic SDOF effect, e.g., with minimal physically-inaccurate occlusions, mischaracterizations of foreground pixels as background pixels (or vice versa), etc.

The advent of mobile, multifunction devices, such as smartphones and tablet devices, has resulted in a desire for high-resolution, high dynamic range, and small form factor cameras, capable of generating high levels of image quality in real time or near-real time, for integration into such mobile, multifunction devices. Increasingly, as users rely on these multifunction devices as their primary cameras for day-to-day use, users demand features, e.g., portrait photography, which they have become accustomed to using in dedicated-purpose camera bodies. Thus, what is needed are techniques to synthesize SDOF effects, e.g., out-of-focus background renderings, in a computationally-efficient manner that reduces overall processing time. Such techniques may be applied to images to create the effect of a shallower depth of field than would normally be seen in images naturally captured by a device's camera system.

SUMMARY

Camera devices, computer readable storage media, and related methods are disclosed herein that are configured to synthesize out-of-focus background rendering in a computationally-efficient manner for images captured by large depth of field ("LDOF") cameras, such as small form-factor cameras having smaller lens apertures. This synthetic rendering may be used to approximate an image captured with a SDOF. It should be appreciated that any description of creating/synthesizing/rendering a SDOF or out-of-focus effect from a LDOF image (or image captured from a LDOF camera) is meant to capture a relative change in the depth of field of the image (i.e., the image has a first "large" depth of field when captured that is synthetically reduced to a smaller "shallow" depth of field) and not to imply any particular ranges of depth of field.

According to some embodiments disclosed herein, the camera devices may utilize one (or more) image sensors to capture an input image, as well as corresponding depth information data for the captured scene that may indicate the portions of the image that are in the scene's background and/or foreground (e.g., by using a secondary stereo camera and/or other types of depth sensors). According to some such embodiments, the depth information data may be represented in the form of a blur map, e.g., a two-dimensional array of blur values, wherein each blur value represents a radius, diameter (or other size-indicative parameter) of the blurring "circle of confusion" of the corresponding pixel in the captured image.

After capturing the input image, some pre-processing may be performed on the input image, e.g., to convert it into a desired color space and/or include the corresponding information from the blur map with the color data for each individual pixel. At this stage, a sparse sampling may be performed in the neighborhood of pixels surrounding each image pixel. That is, rather than "spreading" the light of each pixel onto all other pixels within the blurring radius and accumulating the results, the process may sparsely sample (e.g., using a randomized distribution) some number of pixels in the surrounding neighborhood of input image pixels and gather the light and/or color information from such neighboring pixels to adjust the output value of the base input pixel based on the gathered information. This process is also referred to herein as "gathering."

According to some embodiments, the process may weight the light and/or color information values from each sparsely sampled neighborhood pixel, e.g., based on a determination of how prominent each such neighborhood pixel should be in the output synthetic SDOF image. After the values of the output pixels in the image have been altered based on the weighted contributions of the sparsely sampled neighborhood pixels, an anti-aliasing process may be performed to account for any undesirable noise artifacts that may have been caused, e.g., by the sparseness of the sampling. Finally, the pixel information may be selectively up-sampled, and converted back into the desired color space for the output synthetic SDOF image.

According to some embodiments, special care may be taken when blurring the background portions to the original input image, to help the resultant synthesized image maintain the look and feel of a true/real optical system. For example, the blurred background discs (or other synthesized background elements to simulate SDOF effects) should be configured such that they do not occlude, i.e., block, an object that is in the foreground of the scene and likely in sharp focus (or, in some instances, an object at a shallower scene depth than the background light source being blurred), as that would potentially result in an unnatural effect in the synthesized SDOF image.

Further advantages of the techniques disclosed herein include the fact that scene highlights are more accurately estimated in the synthesized SDOF image (e.g., in the event of saturated sensor pixels), edges in the scene are more accurately preserved (e.g., sharp changes in depth between the edges of foreground objects and the scene background), and random pixel sampling distributions are generated in a computationally-effective manner (e.g., by using a pseudo-random number generator and non-uniformity compensation functions, as will be discussed in further detail below).

Thus, according to some embodiments, a non-transitory program storage device is disclosed. The program storage device is readable by a programmable control device. Instructions are stored on the program storage device for causing the programmable control device to: obtain a first image comprising a first plurality of pixels having values; obtain a first blur map, wherein the first blur map comprises a plurality of blur values, each blur value corresponding to a pixel in the first plurality of pixels; for each of one or more pixels of the first plurality of pixels: select a second plurality of candidate pixels surrounding the respective pixel from the one or more pixels of the first plurality of pixels; and compute a blurred value for the respective pixel from the one or more pixels of the first plurality of pixels based, at least in part, on a weighted combination of one or more characteristics of each of the second plurality of candidate pixels, wherein one of the one or more characteristics of each of the second plurality of candidate pixels comprises the respective candidate pixel's corresponding blur value in the first blur map; and generate a blurred version of the first image based, at least in part, on the computed blur values of the one or more pixels of the first plurality of pixels.

Various methods of synthesizing out-of-focus image effects in a computationally-efficient manner for images captured by LDOF cameras are also disclosed herein, in accordance with the program storage device embodiments enumerated above.

Various electronic imaging devices are also disclosed herein, in accordance with the program storage device embodiments enumerated above. Such electronic devices may include one or more optical sensors/camera units; a programmable control device; and a memory coupled to the programmable control device. Instructions are stored in the memory, the instructions causing the programmable control device to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
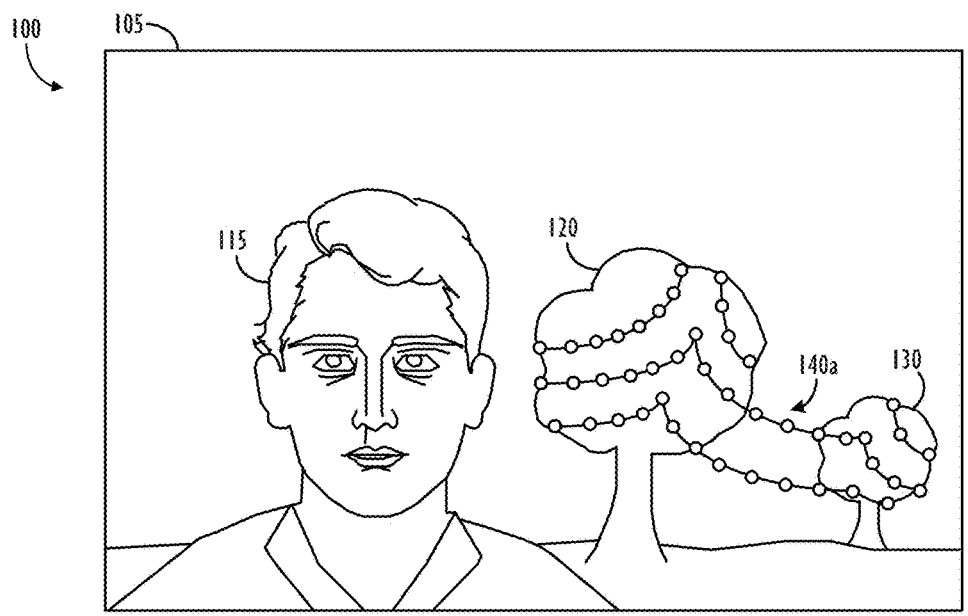
FIG. 1A is a sample image of a scene to which synthetic SDOF effects are desired to be applied.

Turning now to FIG. 1A, a sample image 100 of a scene 105 to which synthetic SDOF effects are desired to be applied is shown. The scene 105 comprises human subject 115 in the foreground of scene 105, as well as several elements in the background of scene 105, e.g.: trees 120 and 130, and individual point light sources 140*a*. The background of scene 105 in image 100 is shown as largely white (i.e., with no gray overlay), indicating that the background is largely in focus in image 100. Very bright light sources in images captured by small form factor cameras having relatively long integration times tend to be largely in focus, but run a risk of fully saturating the corresponding pixels on the camera's image sensor (thus, appearing as pure white in the image 100, even if such light sources actually had a distinct color in scene 105).

Figure 1B:
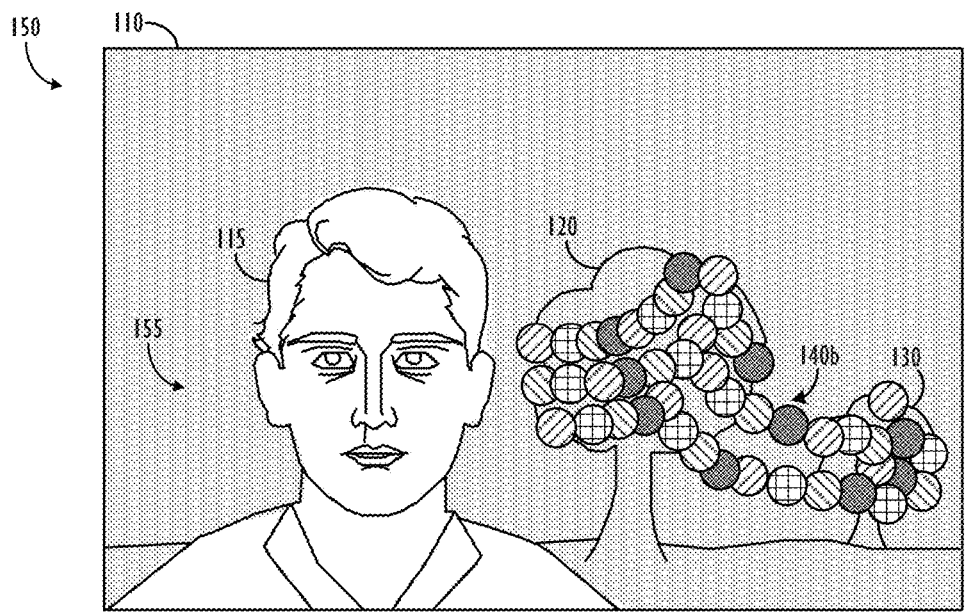
FIG. 1B is a sample image of a scene to which synthetic SDOF effects have been applied, according to one or more embodiments.

Turning now to FIG. 1B, a sample image 150 of scene 110 to which synthetic SDOF effects have been applied is shown, according to one or more embodiments. As compared to image 100 in FIG. 1A, the background of scene 110 in image 150 in FIG. 1B is shown as largely having a gray overlay, indicating that the background is blurred (or otherwise made to appear out of focus) in image 150. Moreover, the elements of scene 110 indicated above in the description of FIG. 1A as being bright enough that they saturated the corresponding pixels on the camera's image sensor (i.e., individual point light sources 140*a*) have been represented as enlarged and blurred bokeh disc shapes, as seen, e.g., in the representation of individual point light sources 140*b* in FIG. 1B. Improved techniques for producing synthetic SDOF effects, e.g., those illustrated in image 150 of FIG. 1B, will now be described in further detail.

Figure 2:
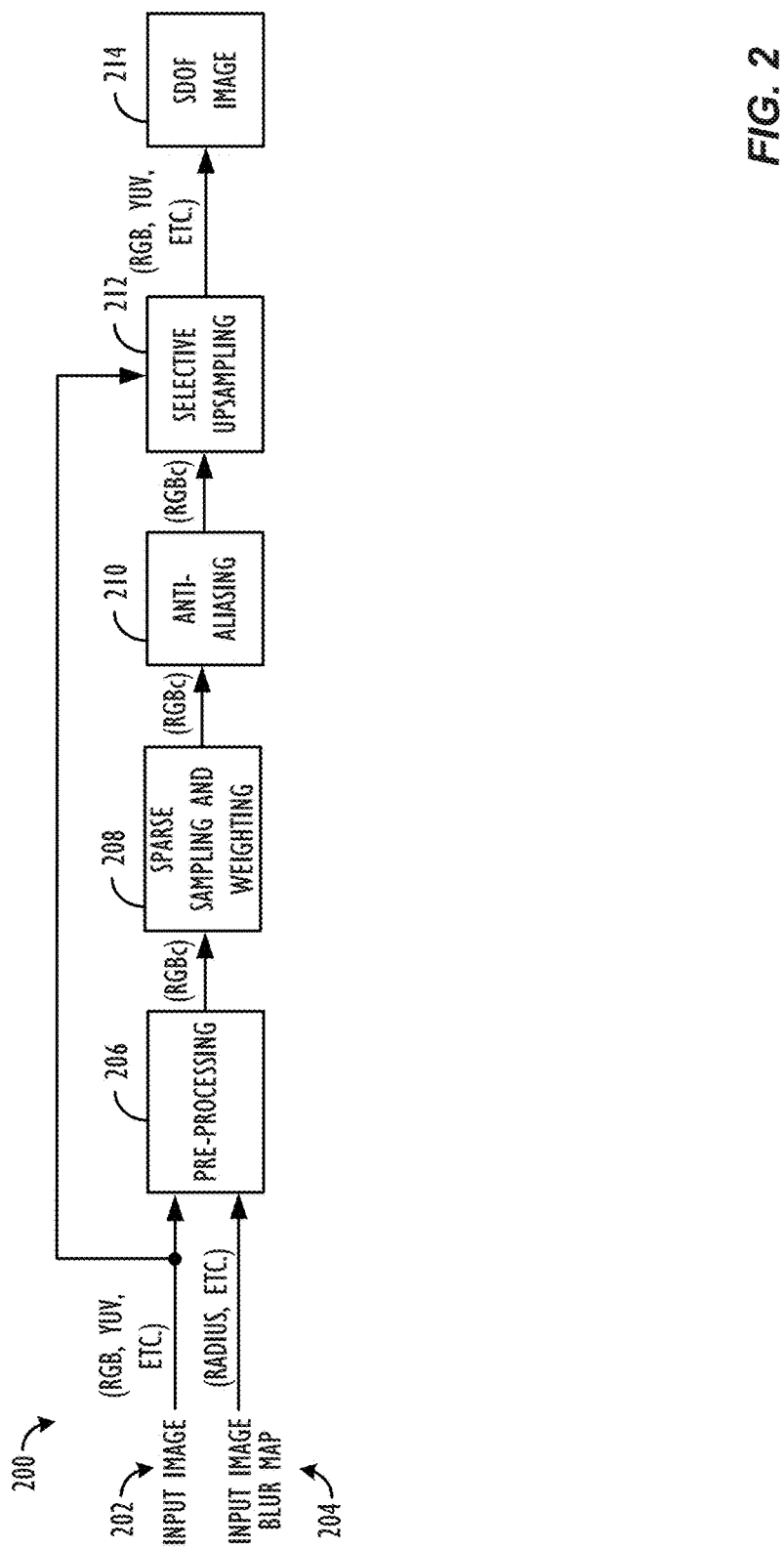
FIG. 2 is an exemplary image processing pipeline for synthesizing SDOF effects, according to one or more embodiments.

Turning now to FIG. 2, an exemplary image processing pipeline 200 for synthesizing SDOF effects is illustrated, according to one or more embodiments. The pipeline begins with inputs of: input image 202 and input image blur map 204. The input image may be in one of several possible color spaces. For example, RGB color spaces, such as sRGB and DCI-P3, or YUV color spaces, such as BT.601 and BT.709, are popular color spaces that image color data may be captured in. The blur map 204 may, e.g., comprise a two-dimensional array of blur values, wherein each blur value represents a radius, diameter (or other size-indicative parameter) of the blurring "circle of confusion" of the corresponding pixel in the captured image. Next, some pre-processing (206) may be performed on the image, e.g., to convert the image into a desired color space, include the corresponding information from the blur map with the color data for each individual pixel, and/or downsample the color image and blur map image. This color space will be represented as "RGBc" herein and in FIG. 2, for the sake of this example, wherein 'R' refers to the red color channel, 'G' refers to the green color channel, 'B' refers to the blue color channel, and 'c' refers to the radius of the circle of confusion, i.e., the "blur radius," for the pixel.

At this stage in the image processing pipeline, a sparse sampling (208) may be performed in the neighborhood of pixels surrounding each image pixel. As will be described in greater detail below, rather than spreading the light of each pixel onto all other pixels within the blurring radius and accumulating the results, the process may sparsely sample, that is, select, some number of pixels in the surrounding neighborhood of input image pixels (e.g., using a randomized distribution) and then gather and weight the light and/or color information from such neighboring pixels to adjust the output value on the input pixel based on the accumulated gathered information. According to some embodiments, the process may approximate the SDOF effects by weighting the light and/or color information values from each sparsely sampled neighborhood pixel, e.g., based on a determination of how prominent each such neighborhood pixel should be in the output synthetic SDOF image.

After the values of the pixels in the sampled image have been found based on the determined weighted contributions of the sparsely sampled neighborhood pixels, an anti-aliasing process (210) may be performed on the output image data to account for any undesirable noise that may have been caused, e.g., by the sparseness of the sampling. The anti-aliasing process (210) may be thought of as a type of variable smoothing operation where the level of smoothing/blurring is determined by each pixel's blur radius. Finally, the anti-aliased color pixel information may be selectively up-sampled (212) and combined with the original input image (202), then converted back into the desired color space, e.g., an RGB color space or YUV color space, for the output synthetic SDOF image (214).

Figure 3:
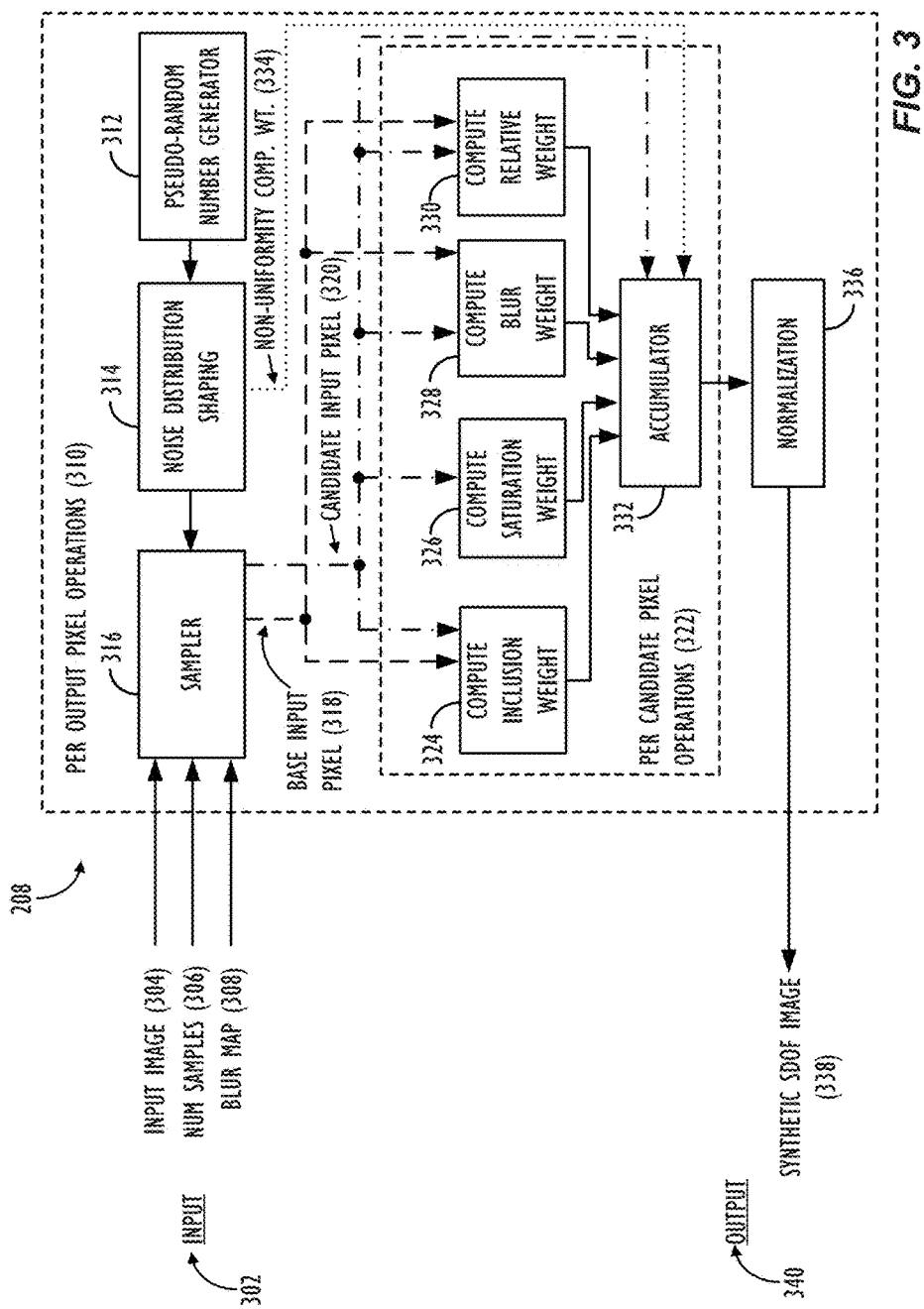
FIG. 3 is a block diagram giving more detail to sparse sampling and weighting processes that may be employed in an exemplary image processing pipeline for synthesizing SDOF effects, according to one or more embodiments.

Turning now to FIG. 3, a block diagram giving more detail to the sparse sampling and weighting process 208 from FIG. 2 is illustrated, according to one or more embodiments. As discussed above, the inputs (302) to the sparse sampling and weighting process 208 may comprise, e.g.: the input image (304); the corresponding blur map (308), which may, e.g., specify the blur radius for all pixels in the input image; and a number of pixel samples (306) to be used in the plurality of candidate pixels surrounding a given input image pixel during the aforementioned sparse sampling process.

Next, the operations that are performed per output pixel (310) will be discussed in greater detail. As used herein, the term "output" pixel refers to a pixel which will be represented in the output synthetic SDOF image. Each output pixel may be thought of as having a corresponding base "input" pixel at the same location in the input image (304). First, one or more random or pseudo-random number generators (312) may be used to generate a number of randomly-distributed sample positions equal to the number of pixel samples (306) value that was obtained as part of the input configuration. Due to the sparse nature of the sampling, any input image with structured high frequency content has the risk of producing unwanted aliasing artifacts in the sampled output image, which may be seen as banding or concentric circular patterns. Thus, it is important to be sensitive to high frequency information in images, e.g., by sampling in a non-regular pattern. In some embodiments, this may be achieved by sampling in a per-pixel uniformly-distributed random pattern, resulting in any aliasing artifacts being spatially non-correlated. According to some embodiments the, randomly-generated distribution of samples may need to be re-shaped (314) and/or weight-compensated for non-uniformity (334), e.g., to provide more equally-distributed coverage of the blurring neighborhood. According to other embodiments, predetermined irregular patterns of sampling distributions may also be employed, e.g., if it is not desirable to create a new random distribution of sample positions for each processed image.

As will be explained in more detail below, some computationally-efficient random sample distribution methods will have to be modified for certain blurring neighborhood shapes, such as circular blurring neighborhoods, or other more complex shapes, such as stars, pentagons, etc. Shaping the noise distribution (314) may comprise, e.g., removing randomly-generated points that fall outside of the blurring neighborhood, moving randomly-generated points that fall outside of the blurring neighborhood to locations inside the blurring neighborhood, or modifying the density (e.g., via a non-uniformity compensation weighting factor 334) of the sample distribution at certain places in the blurring neighborhood. Once the sampler (316) has the final set of random samples that will be used as the "candidate pixels" for the present input pixel, the process may move on to the so-called per-candidate pixel operations (322).

According to some embodiments, one or more weights may be computed based on one or more characteristics of each candidate input pixel (320) with respect to the present base input pixel (318), i.e., the pixel in the input image that is at the same location as the output pixel currently being calculated. Computations of each of the following exemplary weights will now be discussed in greater detail: inclusion weight (324); saturation weight (326); blur weight (328); relative weight (330); and non-uniformity compensation weight (334). As will be appreciated, each of these weighting values is determined to provide a more natural looking synthesized SDOF effect in a computationally-efficient fashion.

Inclusion Weight

The computation of inclusion weight (324) is designed to control the degree to which a candidate pixel's color or light intensity value should be included in the blurring calculation for a present output pixel if the candidate pixel's light intensity (based, e.g., on its blur radius value from the blurring map) would reach the present output pixel. In one embodiment, the inclusion weight could be a binary value, e.g., a weight of '0' if the candidate pixel's light does not affect the present output pixel (i.e., if the candidate pixel's blur radius would not encompass the present output pixel) or a weight of '1' if pixel does affect the present output pixel (i.e., if the candidate pixel's blur radius would encompass the present output pixel).

Figure 4:
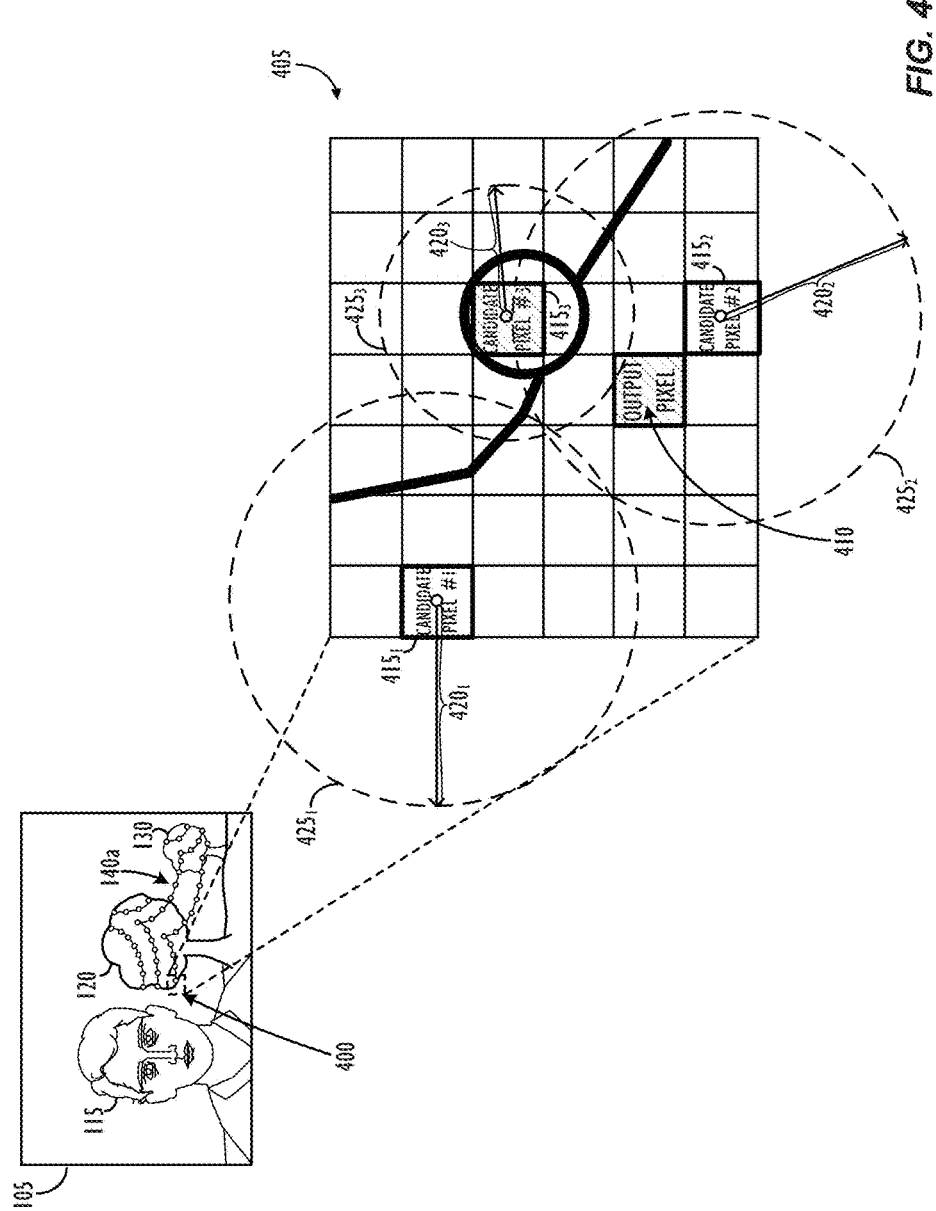
FIG. 4 illustrates an example of a generated plurality of candidate pixels for a particular output pixel, according to one or more embodiments.

Turning now to FIG. 4, an example of a generated plurality of candidate pixels 415 for a particular output pixel 410 is illustrated, according to one or more embodiments. Region 400 from image 105 has been magnified into region 405 for explanatory purposes here so that individual exemplary pixels may be seen. As shown in FIG. 4, candidate pixel 1 ($415_1$) has a blur radius of $420_1$, resulting in a blurring circle $425_1$ that does not intersect or encompass the output pixel 410. Thus, in the simple binary example discussed above, candidate pixel 1 ($415_1$) would receive an inclusion weight of 0, since its light would not affect the SDOF blurring of output pixel 410. Candidate pixel 2 ($415_2$), by contrast, has a blur radius of $420_2$, resulting in a blurring circle $425_2$ that does encompass the output pixel 410. Thus, in the simple binary example discussed above, candidate pixel 2 ($415_2$) would receive an inclusion weight of 1, since its light would affect the SDOF blurring of output pixel 410. Likewise, in the example of FIG. 4, candidate pixel 3 ($415_3$) has a blur radius of $420_3$, resulting in a blurring circle $425_3$ that does encompass the output pixel 410. Thus, in the simple binary example discussed above, candidate pixel 3 ($415_3$) would also receive an inclusion weight of 1, since its light would be very likely to affect the SDOF blurring of output pixel 410 in a SDOF synthesis operation.

Figure 5:
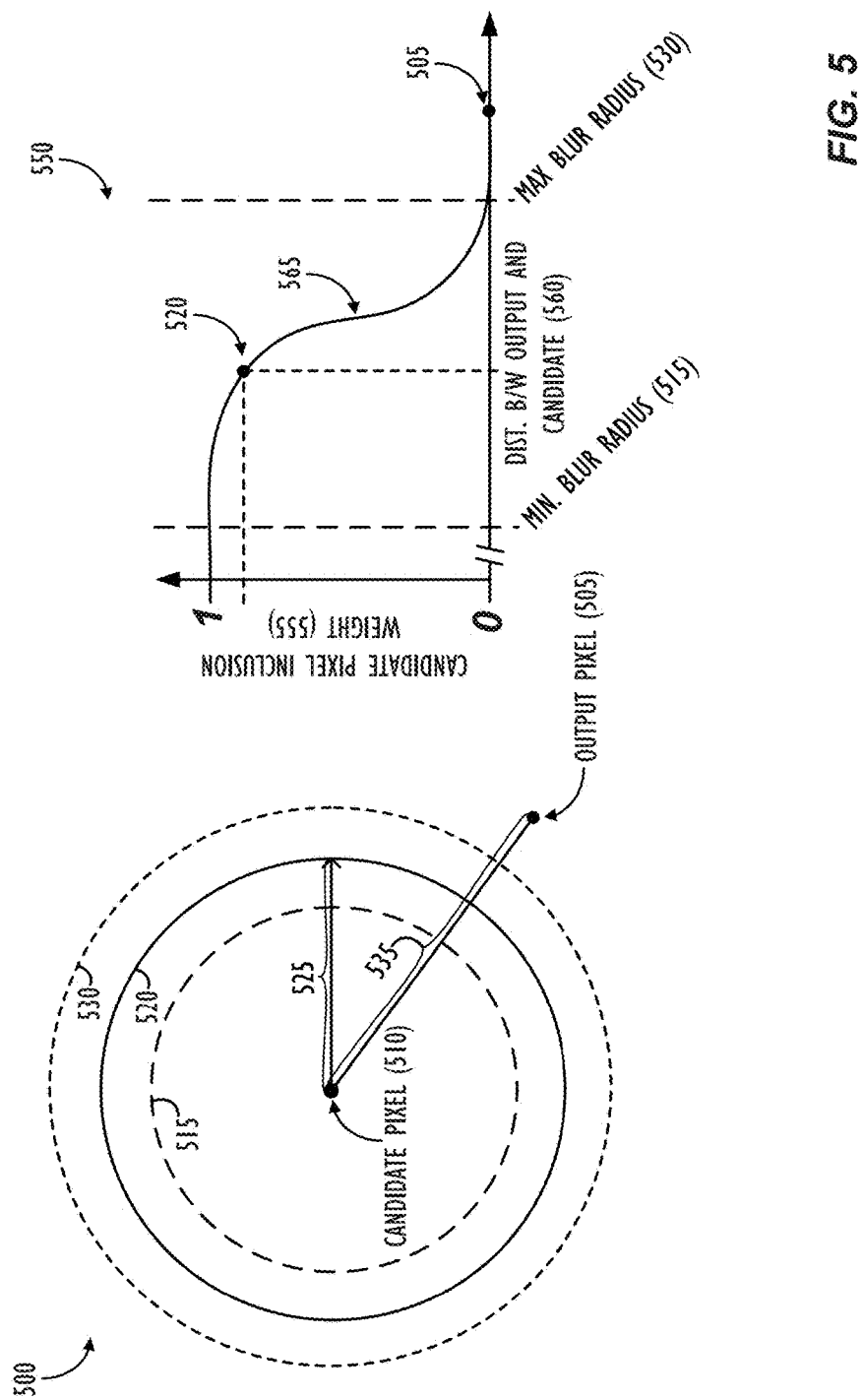
FIG. 5 illustrates an exemplary inclusion weighting function, according to one or more embodiments.

Turning now to FIG. 5, an exemplary inclusion weighting function 565 is illustrated, according to one or more embodiments. According to such embodiments, rather than having just a binary inclusion weight scheme of values 0 or 1, a tunable threshold may be used, wherein the weight value assigned to a pixel may taper off gradually as the distance between the candidate pixel and the present output pixel increases, until finally dropping to zero past a maximum blur radius.

The various tunable thresholds of inclusion weighting function 565 are further illustrated in example 500 of FIG. 5. In particular, the present output pixel 505 is represented as being a distance of radius 535 away from candidate pixel 510. In this example the output pixel 505 is represented as being outside both the minimum blur radius circle 515 and the maximum blur radius circle 530. Thus, as shown in the graph 550, which plots candidate pixel inclusion weight 555 on the y-axis and distance between present output pixel and candidate pixel 560 on the x-axis, the illustrated candidate pixel 510 and output pixel 505 pairing would be assigned an inclusion weight of 0, since the candidate pixel 510 is so far away from the output pixel, i.e., a distance of 535, that its actual blur circle 520, having blur radius 525, does not encompass or intersect the output pixel 505, thus providing an indication that the light energy from candidate pixel 510 should not influence the blurring result of the output pixel 505. As further illustrated in graph 550, if the output pixel 505 had instead been located along blur circle 520, i.e., at a distance of 525, the candidate pixel 510 would have been assigned a value fairly close to 1, as indicated by the meeting of the dashed lines in graph 550 at point 520. According to the weighting function 565, any time a candidate pixel and output pixel are closer to each other than the minimum blur radius circle 515, the pixel will be assigned an inclusion weight of '1'. Likewise, any time a candidate pixel and output pixel are farther away from each other than the maximum blur radius circle 530, the pixel will be assigned an inclusion weight of '0'. As may now be understood, any number of weighting functions 565 may be used for a given implementation based, e.g., on how 'binary' or 'tunable' of an inclusion weighting assignment scheme is desired for the given implementation.

Saturation Weight

Discussion will now turn back now to the computation of saturation weight (326), as illustrated in FIG. 3. The saturation weight is designed to help recover highlights to a greater degree in the synthetic SDOF image. Because point light sources are often many magnitudes brighter than their surroundings, the resulting defocused image from a true optical system will result in a clear disc shape (i.e., bokeh disc) for the point source. However, due to the limited dynamic range of imaging sensors, much of the pixel's original light/color intensity information will be lost. For example, if there is a background light source in an image that is reddish in color, e.g., light source 140a in FIG. 1B, an SDOF rendering process may be able to reproduce the reddish color of the light source, assuming the image signal processor (ISP) was able to accurately capture the relative weights of the color channels for the relevant pixels, but it might not be able to recover the correct intensity values for the light source, since it will likely have saturated the sensor's maximum intensity value (as determined by the ISP's bit depth). In other words, given an 8-bit color/intensity depth, the brightest value that a pixel can record is 255, i.e., $(2^8)-1$. Because of this (assuming that the image is encoded with a gamma of 2.2), a pixel with a value of 255 will render as only 165 times brighter than a very faint light source with a brightness value of 25 in the image; when, in reality, the point light source was probably much brighter than the faint light source, i.e., much more than 165 times brighter. Thus, according to some embodiments, the saturation weight may attempt to make up for this physical inaccuracy by assuming that, if a pixel's value is very high (e.g., 255 in an 8-bit system), it's actually a much higher value that the sensor was simply not able to capture due to saturating at its maximum readout level. Thus, the saturation weighting factor may be utilized to work around the limitations of the bit depth of digitized data by giving a (seemingly) disproportionate weight to pixels that are already very bright.

This type of saturation weighting also has the unexpected benefit that it mimics the human visual perception system's tendency to view a hard black and white edge in an image moving from being in focus to being out of focus as seemingly having the edge eating into the darker region in the image (rather than eating into the lighter region in the image).

Blur Weight

Discussion will now turn back now to the computation of blur weight (328), as illustrated in FIG. 3. The blur weight is designed to mimic the preservation of energy principles involved in photography and, in particular, the spreading out of a light source's energy over a disc when it is captured out of focus. For example, in the case of an in-focus point light source, most of its energy is concentrated in a tiny area. For an out of focus light, by contrast, the light's energy is spread out more, so its contribution to any particular neighboring pixel in the image is smaller. Thus, the blur weight is also designed to be inversely proportional to the blurring radius or "disc area" of the candidate pixel.

Relative Weight

Discussion will now turn back to the computation of relative weight (330), as illustrated in FIG. 3. The relative weight is designed to account for occluded pixels in the image, e.g., background objects that are blocked from view by one or more objects that are closer to the foreground of the scene. According to some embodiments, the relative weight may be calculated by comparing the blur radius of the present output pixel and the blur radius of each of the sample candidate pixels. In particular, if the blur radius of the present output pixel is significantly different than the blur radius of a particular candidate pixel, then the particular candidate pixel may be given a lower relative weight.

This insight follows the physical world principle that, if a point in the foreground is itself occluding an object in the background, then the spreading behind the object should not influence the foreground output pixel. In other words, it would be physically inaccurate if the bokeh disc of a point light source in the scene background spread into or over an object that is in front of it in the scene. Thus, according to some embodiments, if a background candidate pixel's intensity is above a certain threshold, the relative weight may be used to wait such background candidate pixels to 0, so that the synthetic SDOF blurring process described herein does not allow a background light source to influence a pixel that is shallower in the scene.

As may now be appreciated, according to some embodiments, the formula for computing a blurred output value for specified output pixel may be represented as follows:

$$I_{out}(x, y, c) = \frac{\Sigma_{(i,j) \in n}(W_{inclusion} \times W_{saturation} \times W_{blur} \times W_{nuc} \times W_{relative} \times I_{in}(i, j, c)) + \varepsilon I_{in}(x, y, c)}{\Sigma_{(i,j) \in n}(W_{inclusion} \times W_{saturation} \times W_{blur} \times W_{nuc} \times W_{relative}) + \varepsilon} \quad \text{(Eqn. 1)}$$

where c is a color channel value, x and y are the coordinates of the present output pixel, i and j are the coordinates of the candidate pixels corresponding to the output pixel at coordinates (x, y), $W_{inclusion}$ is the aforementioned inclusion weight, $W_{saturation}$ is the aforementioned saturation weight, $W_{blur}$ is the aforementioned blurring weight, $W_{relative}$ is the aforementioned relative weight, $\varepsilon$ is a very small weighting factor applied to the intensity value of the base input pixel to prevent numerical instability, and $W_{nuc}$ is a weight that may need to be applied to compensate for the candidate pixels having a non-uniform random distribution, as will be explained further below. Note that the denominator in Eqn. 1 is used to normalize the output result, i.e., to divide by the final sum of all the weight-products.

The various weighted values for each candidate pixel in a given output pixel's randomly-sampled neighborhood (including the aforementioned non-uniformity compensation weight 334) may be accumulated by accumulator 332 of FIG. 3, which may be initialized with the value of the input pixel at the same location and multiplied by a small epsilon value, i.e., a value that may be used to prevent invalid results when no candidate pixels are determined to be included in the output pixel. The epsilon value may be determined, e.g., by the numerical limitations of the accumulator, i.e., chosen to be as small as possible, while still allowing the weighted input pixel to be accurately represented. Once all the candidate pixels for the specified output pixel location have been considered, the accumulated weighted color (i.e., light intensity) values may be normalized by the accumulated weight (336). Once the per input pixel operations (310) have concluded for all desired pixels in the input image 304, the process may perform any desired post-processing on the image data (e.g., the anti-aliasing and/or selective upsampling processes described above with reference to FIG. 2), thus resulting in an output 340 of an efficiently-computed synthetic SDOF image 338.

Random Sample Distribution Shaping

As mentioned above, in some instances, the distribution of randomly-sampled candidate pixel points may need to be reshaped or modified in some fashion to account for either computational shortcuts taken in the random sample generation process or in order to make it more likely a natural blurring result is achieved (i.e., a blurring result that does not disproportionately oversample a certain region of a pixel's neighborhood).

Figure 6A:
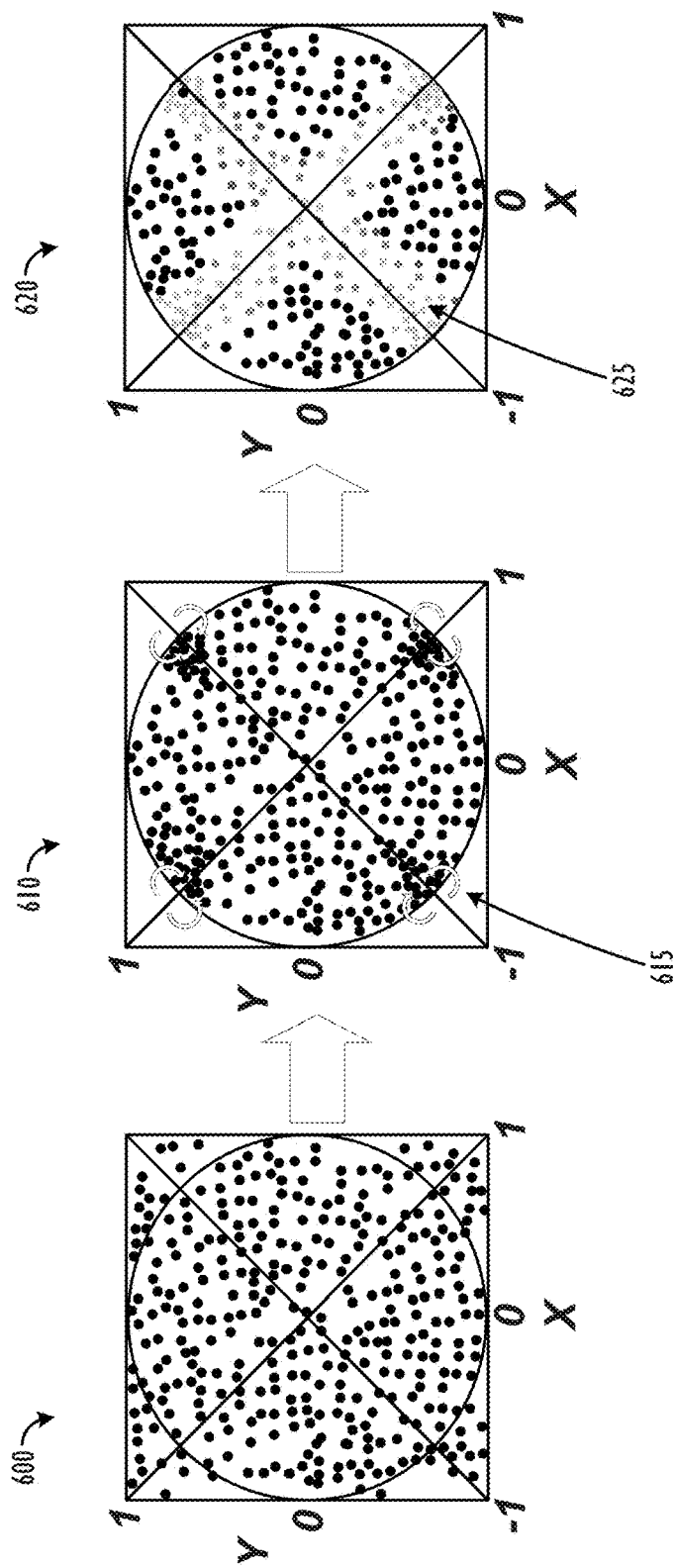
FIG. 6A illustrates an exemplary process of randomly sampling a circular-shaped disc with candidate pixels using a non-uniformity correction function, according to one or more embodiments.

Turning now to FIG. 6A, an exemplary process of randomly sampling a circular-shaped disc with candidate pixels determined using two uniformly-distributed random variables as the locations in a Cartesian coordinate system is shown, as well as the use of a shaping function to make all of the random samples lie within the circle region, and then (if necessary) applying a non-uniformity correction function to adjust each sample's weight to compensate for the higher density of samples in some regions of the distribution As a first step (600), two sets of random, uniformly-distributed numbers may be generated. For explanatory purposes, one set of numbers is mapped from −1 to +1 on an x-axis, and the other set of numbers is mapped from −1 to +1 on a y-axis. As may be understood, this will result in a rectangular distribution of sampled candidate pixels (and, more specifically, a square distribution if the two sets are generated over the same range). However, in the case of attempting to simulate a circular blurring kernel, as is shown in FIG. 6A, there will be a portion of the randomly-generated samples that lie within the square, but outside the circle. These points would be physically irrelevant to a circular blur having the radius specified by the blur map. So, one approach to disregard these points would be to simply discard and sample points that were outside the blurring circle radius. However, this would be very inefficient, and perhaps even more inefficient to determine whether or not a given point lies within the blurring shape for more complex shapes than circles.

Thus, according to some embodiments, as illustrated in step 610, sample points lying in regions 615 outside the blurring circle radius may be moved back inside the circle using a shaping function. One example of a shaping function for mapping points within a square distribution into a circular shape is given as Eqn. 2, below:

$$[x', y'] = \frac{\|x, y\|_\infty}{\|x, y\|_2} [x, y],\quad \text{(Eqn. 2)}$$

where $\|x,y\|_2$ refers to the L2 norm (i.e., the Euclidean distance a from random position to the base input pixel) and $\|x,y\|\infty$ k refers to the L∞ norm, i.e., the length of the longest dimension (also referred to as the "Chebyshev distance").

However, use of such a shaping function may have the effect of clumping too many points along the diagonals of the distribution square, again, as illustrated in step 610. Thus, according to some embodiments, as illustrated in step 620, an additional step may be taken to compensate for the increased density along the diagonals of the distribution, e.g., by reducing the relative weights of samples in regions of the distribution that have an increased density. This process is referred to herein as "non-uniformity compensation", and is illustrated by the more lightly-shaded sample points (625), wherein the lighter shading indicates a lower or lesser weighting of these sample points that are located closer to the diagonals of the distribution. Thus, as illustrated in step 620, by adapting the weight of samples, dependent on their local density, the random sampling distribution may be quickly and computationally efficiently calculated to only sample within a circle and give a uniform distribution—without having to do computationally expensive 'inclusion' tests to see if every sample lies within the boundaries of the blurring shape's region or not.

Figure 6B:
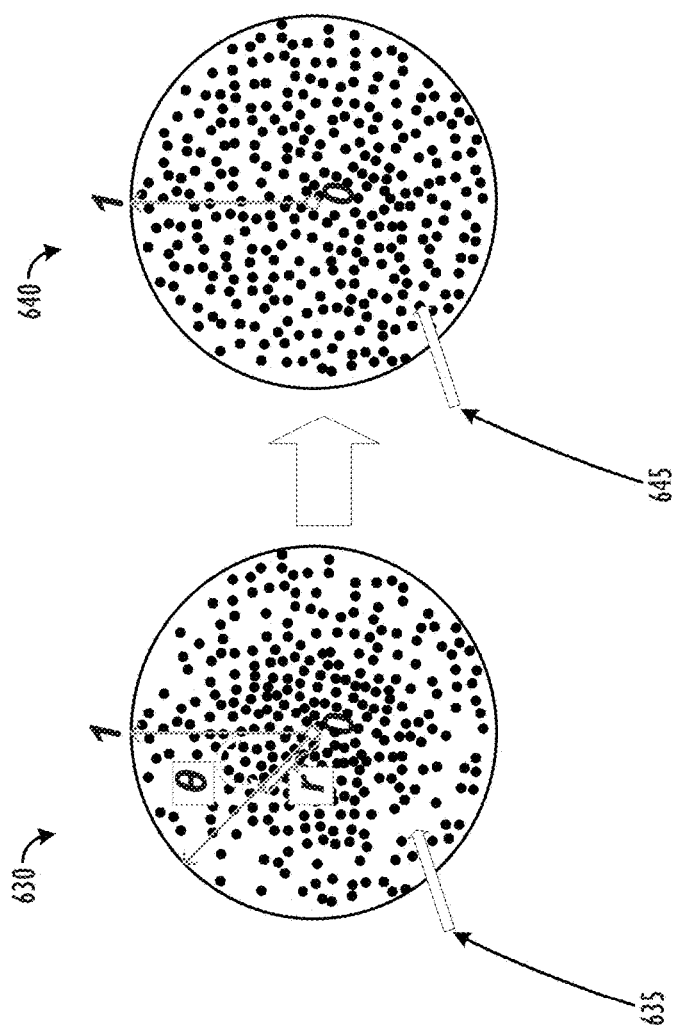
FIG. 6B illustrates an exemplary process of randomly sampling a circular-shaped disc with candidate pixels using a polar coordinate system and a density correction function, according to one or more embodiments.

Turning now to FIG. 6B, an exemplary process of randomly sampling a circular-shaped disc with candidate pixels using a polar coordinate system and a density correction function is illustrated in graphs 630 and 640, according to one or more embodiments. As shown in graph 630, the two random numbers generated in the polar coordinates example may comprise a radius value, r (shown as extending from 0 to 1), and an angular value, θ (extending from 0 degrees to 360 degrees), which together may specify any point within the blurring circle. However, this approach may have certain disadvantages, such as being more computationally expensive (e.g., due to the use of sine and cosine functions to convert back and forth from the randomized Polar coordinates to the Cartesian coordinate system needed to sample the input image). Further, due to the fact that the area of a circular disc increases as the square of the radius, a density correction function (e.g., a square root correction function) would need to be applied on the radius coordinate, r, otherwise the outer portions of the circle (625) would be sampled too sparsely, as shown at 635. Graph 630 reflects an exemplary polar coordinate sampling after the density correction function had been applied, such that the outer portions of the circle would be sampled evenly with the inner portions of the circle, as shown at 645.

Figure 7:
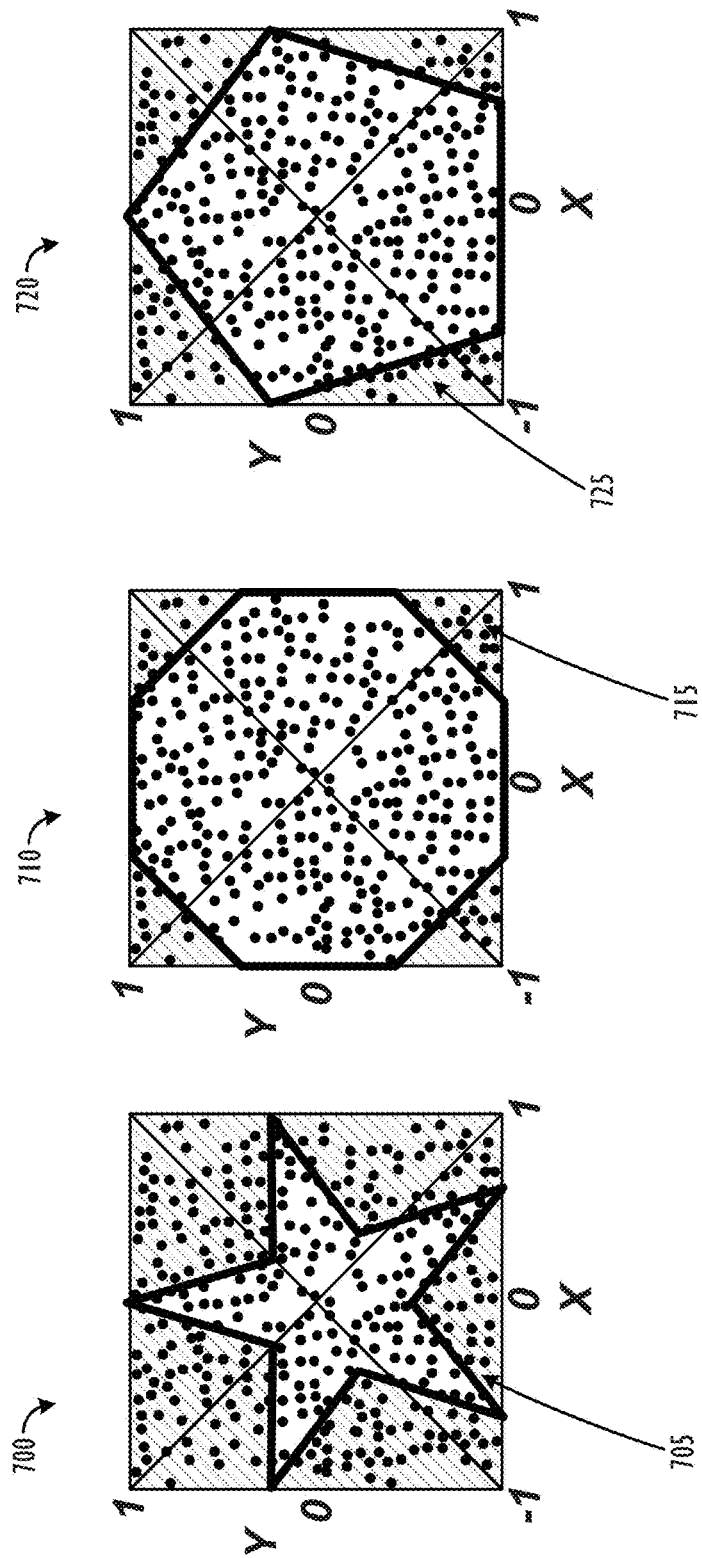
FIG. 7 illustrates several examples of non-circular shapes for candidate pixel distributions, according to one or more embodiments.

Turning now to FIG. 7, several examples of non-circular shapes for candidate pixel distributions are also illustrated, according to one or more embodiments. For example, star blurring kernel 700 has five differently-shaped non-relevant regions 705 that would have to be accounted for when generating the randomly-sampled candidate pixels. Octagon blurring kernel 710 has four similarly-shaped non-relevant regions 715 that would have to be accounted for when generating the randomly-sampled candidate pixels. Pentagon blurring kernel 720 has four differently-shaped non-relevant regions 725 that would have to be accounted for when generating the randomly-sampled candidate pixels. Thus, different blurring shapes would each present unique computations issues to overcome, but may be desirable for a given implementation for artistic reasons or otherwise.

Overall Process Flow

Figure 8:
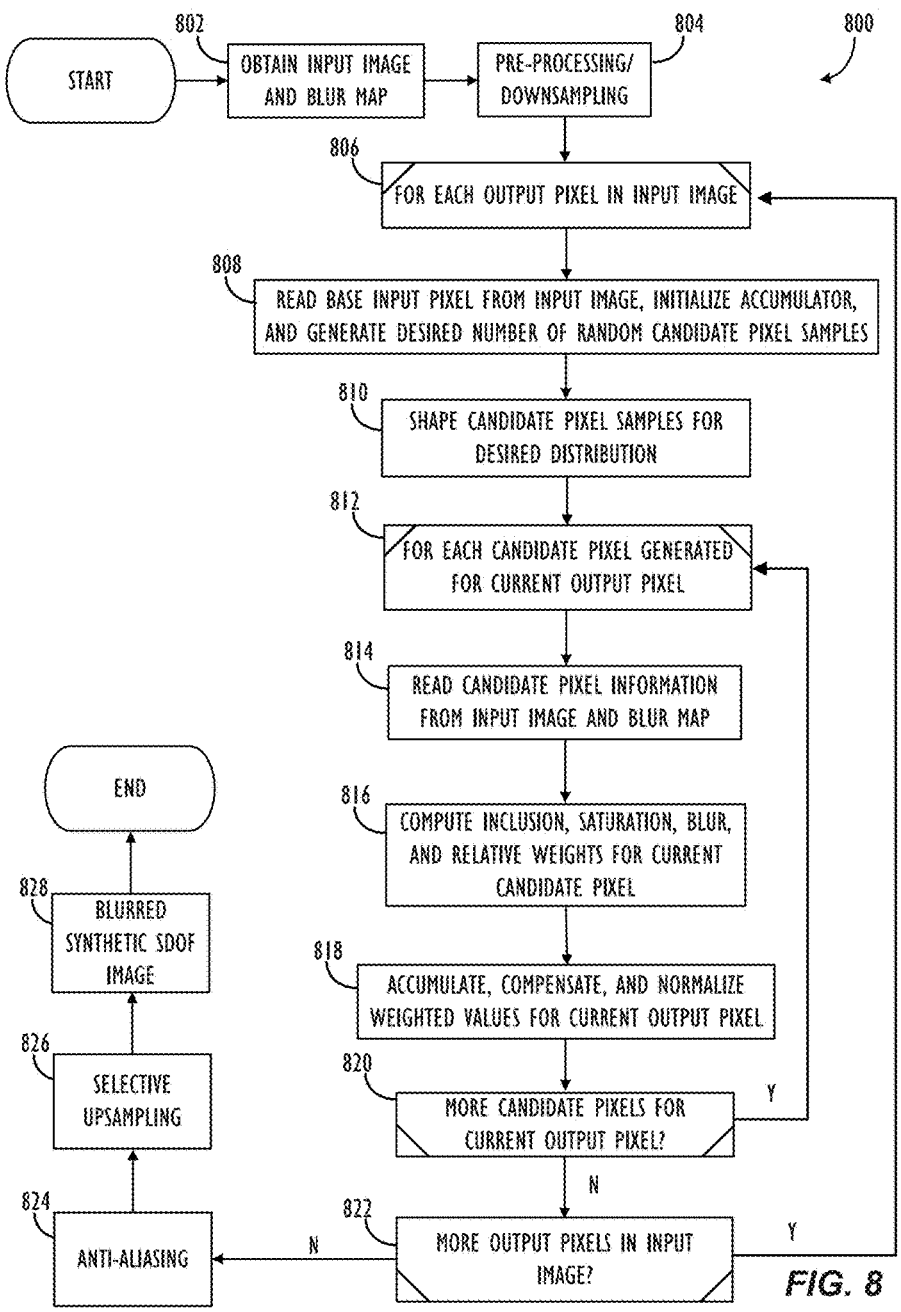
FIG. 8 is a flowchart illustrating a method for synthesizing SDOF effects, according to one or more embodiments.

Turning now to FIG. 8, a flowchart 800 illustrating a method for synthesizing SDOF effects is illustrated, according to one or more embodiments that have been described herein. First, the method may start at Step 802 by obtaining an input image and its corresponding blur map. Next, at Step 804, any desired pre-processing or downsampling may be performed on the input image, as has been discussed above.

Next, for each output pixel in the input image (i.e., the operational loop starting at Step 806), the process may perform Step 808, which may entail reading the present base input pixel's information from the input image and/or blur map, initializing the accumulator's value for the present input pixel, and/or generating the desired number of random candidate pixel samples in the neighborhood of the present output pixel. Next, at Step 810, for each output pixel in the input image, the process may also perform any desired shaping and/or weighting of the randomly-generated candidate pixel samples, e.g., so that the samples are in the desired sampling distribution shape and/or are evenly distributed over the desired sampling region, as described above with reference to FIGS. 6A and 6B.

Then, at Step 812, for each sample candidate pixel in the shaped distribution of candidate pixel samples, the process may read in the present candidate pixel's information form the input image and blur map (Step 814) and then compute the various aforementioned weights, such as the inclusion weight, saturation weight, blur weight, and/or relative weight for the current candidate pixel (Step 816). The weighted values for each candidate pixel in the generated distribution for the current output pixel may then be accumulated, compensated for any non-uniformities in the sampling distribution, and normalized (e.g., based on the sum of all the weighting values), thereby resulting in an updated blurred value for the current output pixel. (Step 818). As long as there are further candidate pixels to process (i.e., 'Y' at Step 820), the process may return to Step 812 to repeat Steps 814, 816, and 818 on the further candidate pixels. Finally, when there are no further candidate pixels to process for the current output pixel (i.e., 'N' at Step 820), the process may proceed to Step 822. Next, if there are additional output pixels to process (i.e., 'Y' at Step 822), the method may return to Step 806. If however, all output pixels have been processed (i.e., 'N' at Step 822), the method may proceed to Step 824 to perform anti-aliasing operations, if so desired.

As mentioned above, an anti-aliasing operation (Step 824) may be applied to the image data. According to some embodiments, the anti-aliasing operation may work by applying a variable radius Gaussian blur to the sampled image, to smooth out the aliasing noise. According to some embodiments, a small variable radius may be used, and a fixed number of filter taps (e.g., 5 taps, 7 taps, 9 taps, etc.) may be used to calculate the Gaussian weights per pixel, where the Gaussian function's standard deviation value may be linearly proportional to the circle of confusion size for the given output pixel. The weight of each pixel may further be multiplied by its blur radius, in order to prevent sharp (i.e., in focus) pixels from bleeding into neighboring blurred pixel regions.

As also mentioned above, if so desired, a selective upsampling operation (Step 826) may also be applied to the image data. According to some embodiments, the selective upsampling operation's input may come from the output of the anti-aliasing operation. The process of constructing the final blurred synthetic SDOF image may further comprise performing a selective up-sampling operation on the low-resolution background blurred regions of the image. The foreground regions from the original full-resolution input image may then be put back into the constructed synthetic SDOF image on top of the blurred background portions of the image (i.e., rather than using the blurred foreground pixels calculated by the sparse sampling and weighting techniques that have been described herein).

Finally, the method may proceed to Step 828 to construct the final output blurred synthetic SDOF image, i.e., using all the desired newly-calculated, blurred values from the performance of method 800. Once the output SDOF image has been synthesized, the method may end.

According to some other embodiments, a blurred synthetic SDOF image may also be generated using alternative techniques to those described above. For example, according to some such embodiments, artifacts in the resulting synthetic SDOF images that would be caused, e.g., by inaccurate blur maps, may be mitigated. For example, in the case of near foreground objects, background pixels in the image may be misclassified as foreground pixels, resulting in sharp and unnatural looking artifacts in the generated synthetic SDOF image. In such instances, the artifacts may be mitigated, e.g., by filtering the image's blur map prior to synthesizing the SDOF effects, as will be discussed below.

According to some such embodiments, the filtering may be implemented using an approach that increases the blur radius of foreground pixels that are classified as being located near background pixels—without affecting the background pixels themselves. In some examples, this approach may comprise the use of a so-called selective average filter, which may seek to find the element-wise average for a subset of pixels surrounding a given pixel in the image's blur map and then select or blend between the original blur radius and the derived average, depending on one or more criteria, such as the maximum of the two values. This process of filtering or blurring the blur map itself may be performed in an iterative manner, using a smaller filter size, to improve computational efficiency. The size of the filter and number of iterations will be dependent on the processing capabilities and/or time constraints of a given implementation. The aim of this iterative blur map filtering process is to reduce the prevalence of occlusion boundaries in the blur map, e.g., where some background pixels may be incorrectly classified as foreground pixels. The filtered blur map may then be used to generate an improved synthetic SDOF image. Such techniques are based on insights into the human visual acuity system and, in particular, the insight that the human eye is more sensitive to background pixels being incorrectly sharp than it is to foreground pixels being incorrectly blurry.

Exemplary Devices

Figure 9:
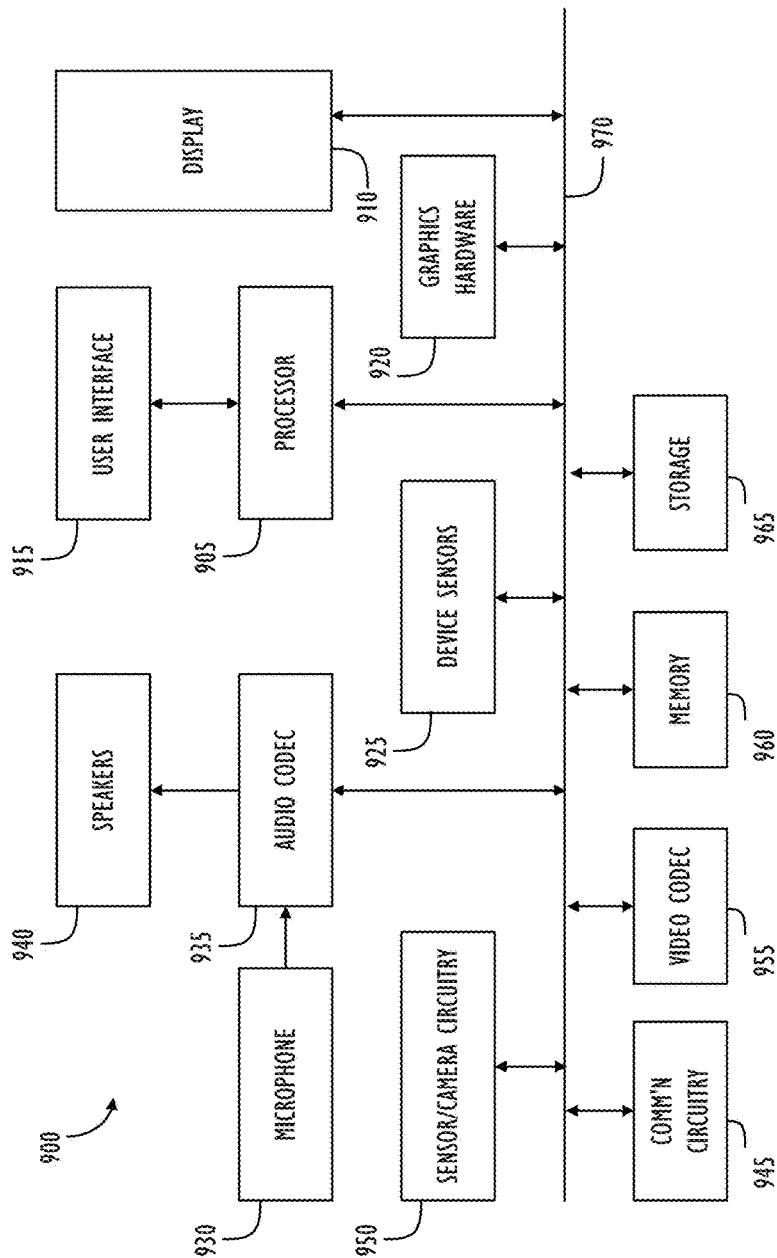
FIG. 9 is a block diagram illustrating a programmable imaging device in which one or more of the techniques disclosed herein may be implemented.

Turning now to FIG. 9, a simplified functional block diagram of illustrative electronic device 900 is shown, according to one or more embodiments. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image capture circuit or unit 950, which may, e.g., comprise single or multiple camera units/optical sensors having different characteristics, video codec(s) 955, memory 960, storage 965, and communications bus 970.

Processor 905 may execute instructions necessary to carry out or control the operation of many functions performed by device 900 (e.g., such as the generation and/or processing of images in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured video stream and/or indicate particular frame(s) that the user would like to have a synthetic SDOF image version of (e.g., by clicking on a physical or virtual button at the moment the desired frame is being displayed on the device's display screen). In one embodiment, display 910 may display a video stream as it is imaged. In another embodiment, processor 905 and/or graphics hardware 920 and/or image capture circuitry may contemporaneously generate and/or display a synthetic SDOF version of the imaged video stream, which synthetic SDOF video stream may also be stored in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Image capture circuitry 950 may comprise one or more camera units configured to capture images, e.g., at different zoom levels or at different resolutions, which may be processed to generate a single synthetic SDOF image for each desired 'instance' of the scene (e.g., 15 fps, 30 fps, only when a capture is indicated by a user, etc.), in accordance with this disclosure. Output from image capture circuitry 950 may be processed, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905, graphics hardware 920, and image capture circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
obtain a first image comprising a first plurality of pixels having values;
obtain a first blur map, wherein the first blur map comprises a plurality of blur values, each blur value corresponding to a pixel in the first plurality of pixels;
for each of one or more pixels of the first plurality of pixels:
select a second plurality of candidate pixels surrounding the respective pixel from the one or more pixels of the first plurality of pixels; and
compute a blurred value for the respective pixel from the one or more pixels of the first plurality of pixels based, at least in part, on a weighted combination of one or more characteristics of each of the second plurality of candidate pixels,
wherein one of the one or more characteristics of each of the second plurality of candidate pixels is based on the respective candidate pixel's corresponding blur value in the first blur map; and
generate a blurred version of the first image based, at least in part, on the computed blur values of the one or more pixels of the first plurality of pixels.

2. The non-transitory program storage device of claim 1, wherein a candidate pixel's corresponding blur value in the first blur map is used to calculate a degree to which a color or light intensity for the candidate pixel should be included in a given weighted combination.

3. The non-transitory program storage device of claim 1, wherein the instructions to select a second plurality of candidate pixels further comprise instructions to:
generate a random distribution of pixel locations.

4. The non-transitory program storage device of claim 3, further comprising instructions to:
reshape the random distribution of pixel locations.

5. The non-transitory program storage device of claim 3, further comprising instructions to:
correct a non-uniformity of the random distribution of pixel locations.

6. The non-transitory program storage device of claim 1, wherein one of the one or more characteristics of each of the second plurality of candidate pixels is a value directly proportional to a color or light intensity value of the respective candidate pixel.

7. The non-transitory program storage device of claim 1, wherein one of the one or more characteristics of each of the second plurality of candidate pixels is a value inversely proportional to the blur value of the respective candidate pixel in the first blur map.

8. The non-transitory program storage device of claim 1, wherein one of the one or more characteristics of each of the second plurality of candidate pixels is a value inversely proportional to the difference between the blur value of the respective candidate pixel and the blur value of the respective pixel from the one or more pixels of the first plurality of pixels.

9. The non-transitory program storage device of claim 1, further comprising instructions to:
perform an anti-aliasing operation on at least a portion of the first image after computing the blur values of the one or more pixels of the first plurality of pixels.

10. An imaging device, comprising:
an imaging system;
a programmable control device; and
a memory coupled to the programmable control device, wherein instructions are stored in the memory, and wherein the instructions, when executed, cause the programmable control device to:
obtain, using the imaging system, a first image comprising a first plurality of pixels having values;
obtain a first blur map, wherein the first blur map comprises a plurality of blur values, each blur value corresponding to a pixel in the first plurality of pixels and indicative of the corresponding pixel's distance from a focus plane in the first image;
for each of one or more pixels of the first plurality of pixels:
select a second plurality of candidate pixels surrounding the respective pixel from the one or more pixels of the first plurality of pixels; and
compute a blurred value for the respective pixel from the one or more pixels of the first plurality of pixels based, at least in part, on a weighted combination of one or more characteristics of each of the second plurality of candidate pixels,
wherein one of the one or more characteristics of each of the second plurality of candidate pixels is based on the respective candidate pixel's corresponding blur value in the first blur map; and
generate a blurred version of the first image based, at least in part, on the computed blur values of the one or more pixels of the first plurality of pixels.

11. The imaging device of claim 10, wherein a candidate pixel's corresponding blur value in the first blur map is used to calculate a degree to which a color or light intensity for the candidate pixel should be included in a given weighted combination.

12. The imaging device of claim 10, wherein the instructions to select a second plurality of candidate pixels further comprise instructions to:
generate a random distribution of pixel locations.

13. The imaging device of claim 12, wherein the instructions further comprise instructions to:
reshape the random distribution of pixel locations.

14. The imaging device of claim 12, wherein the instructions further comprise instructions to:
correct a non-uniformity of the random distribution of pixel locations.

15. The imaging device of claim 10, wherein one of the one or more characteristics of each of the second plurality of candidate pixels is a value directly proportional to a color or light intensity value of the respective candidate pixel.

16. The imaging device of claim 10, wherein one of the one or more characteristics of each of the second plurality of candidate pixels is a value inversely proportional to the blur value of the respective candidate pixel in the first blur map.

17. The imaging device of claim 10, wherein one of the one or more characteristics of each of the second plurality of candidate pixels is a value inversely proportional to the difference between the blur value of the respective candidate pixel and the blur value of the respective pixel from the one or more pixels of the first plurality of pixels.

18. The imaging device of claim 10, further comprising one or more depth sensors, wherein the blur values are based, at least in part, on information obtained by the one or more depth sensors.

19. An image processing method, comprising:
obtaining a first image comprising a first plurality of pixels having values;
obtaining a first blur map, wherein the first blur map comprises a plurality of blur values, each blur value corresponding to a pixel in the first plurality of pixels;
for each of one or more pixels of the first plurality of pixels:
  selecting a second plurality of candidate pixels surrounding the respective pixel from the one or more pixels of the first plurality of pixels; and
  computing a blurred value for the respective pixel from the one or more pixels of the first plurality of pixels based, at least in part, on a weighted combination of one or more characteristics of each of the second plurality of candidate pixels,
  wherein one of the one or more characteristics of each of the second plurality of candidate pixels is based on the respective candidate pixel's corresponding blur value in the first blur map; and
generating a blurred version of the first image based, at least in part, on the computed blur values of the one or more pixels of the first plurality of pixels.

20. The method of claim 19, wherein a candidate pixel's corresponding blur value in the first blur map is used to calculate a degree to which a color or light intensity for the candidate pixel should be included in a given weighted combination.

21. The method of claim 19, wherein selecting a second plurality of candidate pixels further comprises:
generating a random distribution of pixel locations.

22. The method of claim 21, further comprising:
reshaping the random distribution of pixel locations.

23. The method of claim 21, further comprising:
correcting a non-uniformity of the random distribution of pixel locations.

24. The method of claim 19, wherein one of the one or more characteristics of each of the second plurality of candidate pixels is a value directly proportional to a color or light intensity value of the respective candidate pixel.

25. The method of claim 19, wherein one of the one or more characteristics of each of the second plurality of candidate pixels is a value inversely proportional to the blur value of the respective candidate pixel in the first blur map.

26. The method of claim 19, wherein one of the one or more characteristics of each of the second plurality of candidate pixels is a value inversely proportional to the difference between the blur value of the respective candidate pixel and the blur value of the respective pixel from the one or more pixels of the first plurality of pixels.

27. The method of claim 19, further comprising:
performing an anti-aliasing operation on at least a portion of the first image after computing the blur values of the one or more pixels of the first plurality of pixels.

* * * * *